No. 814,516.
PATENTED MAR. 6, 1906.
J. H. BUTTERFIELD.
NUT LOCK.
APPLICATION FILED JULY 10, 1905.
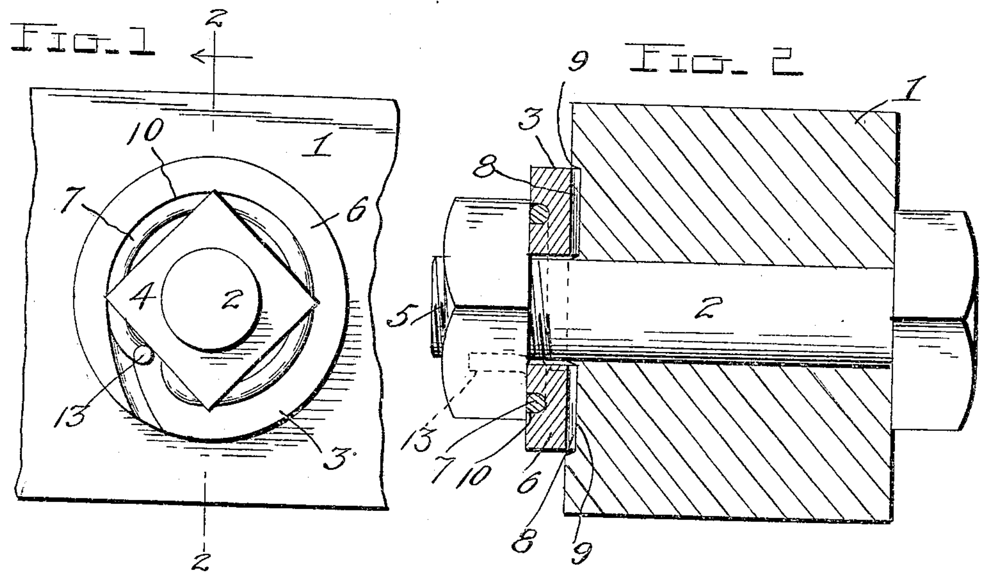
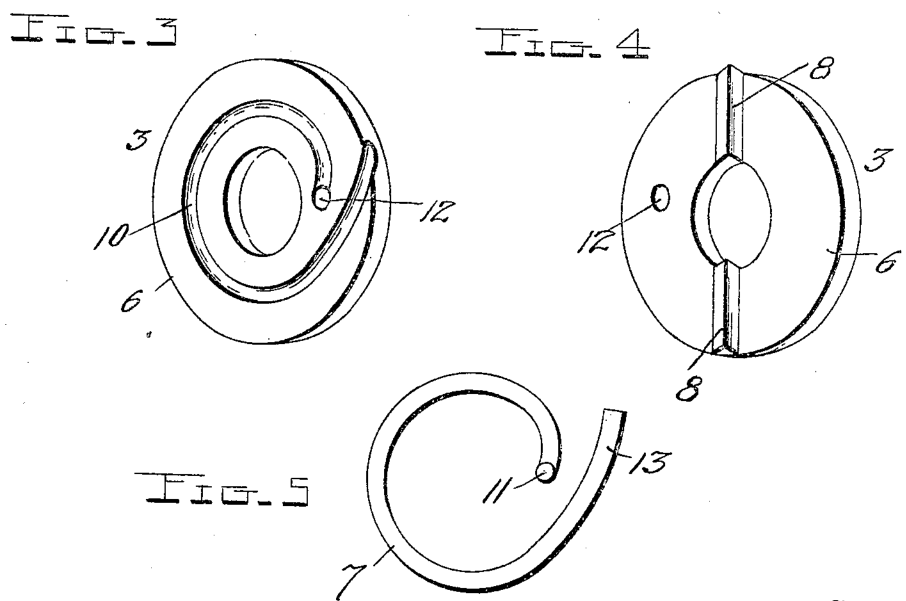
Witnesses
J. H. Griesbauer Jr.
C. H. Griesbauer.
Inventor
James H. Butterfield
by H. B. Willson
Attorney

UNITED STATES PATENT OFFICE.

JAMES H. BUTTERFIELD, OF LOGAN, OHIO.

NUT-LOCK.

No. 814,516. Specification of Letters Patent. Patented March 6, 1906.

Application filed July 10, 1905. Serial No. 269,108.

*To all whom it may concern:*

Be it known that I, JAMES H. BUTTERFIELD, a citizen of the United States, residing at Logan, in the county of Hocking and State of Ohio, have invented certain new and useful Improvements in Nut-Locks; and I do declare the following to be a full, clear, and exact description of the invention, such as will enable others skilled in the art to which it appertains to make and use the same.

My invention relates to improvements in nut-locks; and it consists in the novel construction, combination, and arrangement of devices hereinafter described and claimed.

The object of the invention is to provide a simple and comparatively inexpensive device which may be readily employed upon bolts of any kind to effectively lock their nuts against rotation.

The above and other objects are attained by means of the construction illustrated in the accompanying drawings, in which—

Figure 1 is a side elevation of a nut and bolt with my improved locking washer or device applied thereto. Fig. 2 is a longitudinal sectional view through the same. Fig. 3 is a perspective view of the outer face of the locking-washer. Fig. 4 is a similar view of the inner face of the same, and Fig. 5 is a detail view of the locking-wire.

Referring to the drawings by numeral, 1 denotes an object of any description through which the bolt 2 passes, and 3 denotes my improved locking device for securing the nut 4 upon the screw-threaded end 5 of the bolt. The locking device 3 consists of two parts—a washer 6 and locking-wire 7. The washer 6, which is preferably, but not necessarily, in the form of a circular disk, has upon its inner side means for preventing its rotation upon the object 1. Said means may be of any desired form, but, as illustrated in the drawings, consists of one or more lugs or projections 8, which are adapted to enter the recesses 9, formed in the object 1. In the outer face of the disk or washer 6 is formed a substantially spiral groove 10, in which the locking-wire 7 is seated. The depth of said groove is equal to the diameter of the locking-wire 7, so that the latter does not project beyond the outer face of the washer, and said washer presents a flat surface for engagement by the flat inner surface of the nut. The main portion of the groove 10 is substantially circular in form and of slightly less width or diameter than the length of the diagonal of the nut 4, while the ends of said grooves overlap each other and are of spiral shape, the inner end turning inwardly and the outer one outwardly, as clearly shown in Fig. 3 of the drawings. The locking-wire 7 is adapted to be seated in the groove 10 and may be retained therein by bending its inner end 11 angularly and seating it in an opening 12, formed in the washer. The length of the locking-wire 7 is greater than that of the groove 10, so that its free end 13 projects beyond the edge of the washer to permit it to be readily bent upwardly into engagement with one side of the nut 4 after the latter has been screwed upon the bolt in order to lock the nut thereon. It will be seen that by making the groove 10 of the size and shape illustrated and providing a flexible wire or similar element therein the latter may be bent upwardly at any point, so as to lock the nut in any position.

The construction, operation, and advantage of the invention will be readily understood from the foregoing description, taken in connection with the accompanying drawings.

It will be seen that the devices may be used upon bolts and nuts of the ordinary or any preferred construction and that they will effectively lock the nuts in place wherever they may happen to stop. Owing to the simplicity of the construction, they may be manufactured at a comparatively small cost and may be quickly and easily applied. They will also permit the nuts to be tightened from time to time, as will be readily seen.

Various changes in the form, proportion, and the minor details of construction may be resorted to without departing from the principle or sacrificing any of the advantages of this invention.

Having thus described my invention, what I claim as new, and desire to secure by Letters Patent, is—

The combination of a bolt and nut thereon, with a washer on the bolt and a locking-wire, said washer having projections on its inner side to engage the object against which it is placed, to prevent it from turning, and being provided in its outer face with a spiral groove, terminating outwardly at the edge of the washer, and with an opening 12 at the inner end of said groove, said wire having a spiral portion seated in said groove, its inner end bent and extended into the opening 12 and its outer end bent at an angle and bearing against one side of the nut, the depth of the said groove being equal to the diameter of the locking-wire and the said nut presenting a flat inner surface engaged by the flat outer face of the washer, substantially as described.

In testimony whereof I have hereunto set my hand in presence of two subscribing witnesses.

JAMES H. BUTTERFIELD.

Witnesses:
C. V. WRIGHT,
ELMER O. PETTIT.